DATA PROCESSING SYSTEM INCLUDING PROGRAM TRANSFER MEANS

Filed Sept. 6, 1966

INVENTORS.
JOHN F. COULEUR
PHILIP F. GUDENSCHWAGER
RICHARD L. RUTH
WILLIAM A. SHELLY
LEONARD G. TRUBISKY
BY
ATTORNEYS

United States Patent Office 3,510,845
Patented May 5, 1970

3,510,845
DATA PROCESSING SYSTEM INCLUDING PROGRAM TRANSFER MEANS

John F. Couleur, Phoenix, Philip F. Gudenschwager, Scottsdale, Richard L. Ruth and William A. Shelly, Phoenix, and Leonard G. Trubisky, Scottsdale, Ariz., assignors to General Electric Company, a corporation of New York

Filed Sept. 6, 1966, Ser. No. 577,376
Int. Cl. G06f *3/00*
U.S. Cl. 340—172.5 13 Claims

ABSTRACT OF THE DISCLOSURE

A data processing system having a plurality of subsystems, including a data processor, a memory, and an input/output controller, the latter for connection to and control of a plurality of input/ouput devices. All of the subsystems communicate through a memory controller which acts as a communications hub for the transmission and receipt of information, including data, commands, instructions and codes.

This invention relates generally to data processing systems and, more particularly, to a means for affecting, under certain prescribed conditions, the normal order of instruction execution within a data processing system.

In the customary data processing system, normal operation is achieved by the sequential execution of a group of instructions which are collectively known as a program. It is, however, often desirable and sometimes necessary to provide for some means of deviating or varying from the sequential mode of operation in response to certain prescribed conditions. These conditions may arise from a variety of sources, for example, through some malfunction of either the equipment or the program of the system. In certain other instances it may be desirable to initiate this deviation intentionally by means of an instruction. As an example of an intentional type of deviation, reference is made to copending application Ser. No. 560,684, entitled "Data Processing System" by David L. Bahrs et al., filed June 27, 1966, and assigned to the assignee of the present invention.

In the ensuing discussion of the data processing system which includes the present invention, the means for effecting the deviation or variance from the then being executed program is referred to as a fault routine. While the term "fault" is here utilized, it is to be specifically noted that this does not necessarily indicate that there has been a malfunction within the system and that the entrance of the system into a fault routine is often occasioned as an intentional matter.

The ability to deviate from a purely sequential mode of instruction execution avails a particular subroutine to a plurality of programs. This availability finds particular advantage in multi-program and multi-processor systems in that it enables a programmer to enter into a specific subroutine with but a minimum of programming. As is the case in the aforementioned copending application, this entry is achieved by merely providing the proper format of an instruction word within the program. Additionally, this ability allows for the efficient handling of prescribed condititons which may exist or arise within the system by permitting the orderly transfer of the system from the then existing program to some specific subroutine designed to handle the then existing condition.

While there are several possible ways of effecting a transfer from a given program, the system of the present invention allows great versatility and speed because of its implementation and its lack of necessity of program supervision.

It is, therefore, an object of the present invention to provide an improved data processing system.

Another object is to provide, in a data processing system, improved means for effecting a deviation from normal program operation.

Still another object is to provide means in a data processing system which allow the system to vary its operation from a given program.

A further object is to provide a data processing system employing means for varying, under prescribed conditions, the order of instruction execution.

A still further object of the present invention is to provide a data processing system including improved means to cause the system to transfer from the program then being executed to a different programming sequence.

It is still another object of the present invention to provide a data processing system employing improved means for effecting the transfer of system operation from its then being executed program.

The foregoing objects are achieved, in accordance with the illustrated embodiment of the present invention, by providing a system which employs a plurality of means for respectively registering the existence of any of several conditions necessitating the deviance from the program then being executed. These means provide an output which is sensed by a second means which, in the illustrated embodiment, includes an encoding means. In response to the output of the first means, the second means develops an instruction word which includes an address portion (developed in part by the encoding means) and a prescribed command portion. This instructiton word is then executed and effects the accessing of the system memory to bring to the data processing unit the contents of the location specified by the address portion of the instruction word thus developed. These contents are then utilized to direct the future operation of the system.

The address portion of the instruction word thus developed is a function of the condition which necessitated the variance and thus it is seen that, in accordance with the type of condition registered, various locations within the memory may be addressed. Thus, in the over-all system that location or locations may contain adequate directions for future program direction.

Certain portions of the apparatus herein disclosed are not of our invention, but are the inventions of:

John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

DESCRIPTION OF FIGURES

The present invention may more readily be described by reference to the accompanying drawings in which.

Figure 1:
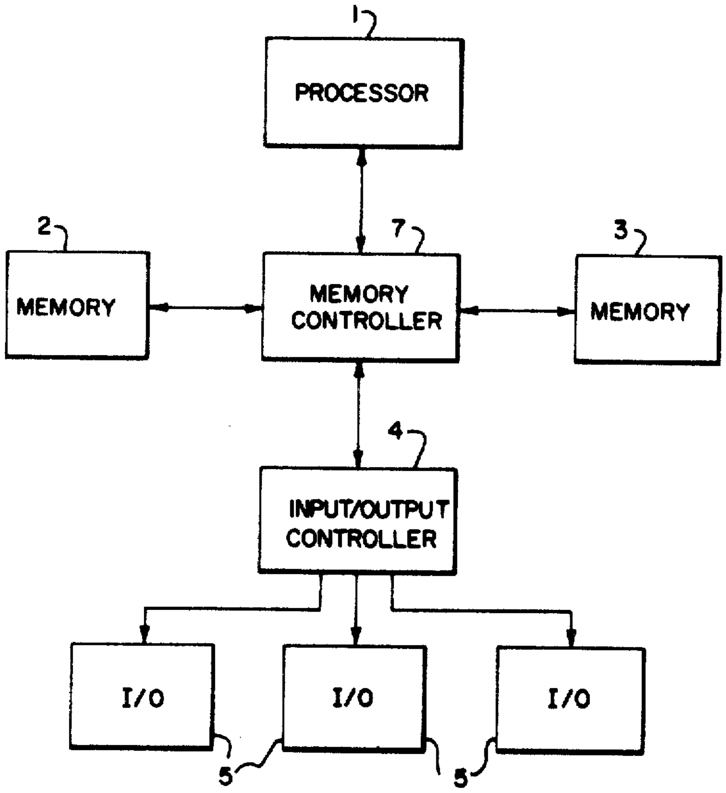
FIG. 1 is a block diagram of a data processing system in a single memory controller configuration.

For a complete description of the system of FIG. 1 and of my invention, reference is made to U.S. Pat. No. 3,413,613 issued to David L. Bahrs, John F. Couleur, Richard L. Ruth, and William A. Shelly, on Nov. 26, 1968, and assigned to the assignee of the present invention. More particularly, attention is directed to FIGS. 2–120 inclusive and to the specification beginning at column 4, line 32 and ending at column 121, line 42, inclusive, of U.S. Pat. No. 3,413,613 which are incorporated herein by reference and made a part hereof.

GENERAL SYSTEM DESCRIPTION

Referring to FIG. 1, a single memory controller configuration data processing system is shown. The data processing system includes a data processor 1, memory devices 2 and 3, an input/output controller 4, and a plurality of input/output devices 5. The processor, input/output controller, and memories are interconnected by a memory controller 7 which controls all communication among the subsystems and performs certain other tasks as will become more apparent as the description proceeds.

Referring to FIG. 2, a multiple memory controller configuration is shown. A single processor 10 is connected to two memory controllers 11 and 12. Each memory controller is connected to a corresponding memory 13 and 14 respectively. Thus, each of the memories may be accessed only through the corresponding memory controller. Input/output controllers 17 and 18 are each connected to both of the memory controllers 11 and 12; however, input/output controller 17 provides the necessary buffering and controlling of input/output devices 19 whereas input-output controller 18 controls input/output devices 20.

Referring to FIG. 3, a multi-processor configuration facilitated by the utilization of a plurality of memory controllers is shown. The configuration of FIG. 3 actually comprises overlapping data processing systems having intercommunication capabilities. Processor 22 is connected to a memory controller 23 and thus to a memory device 24. The memory controller 23 is thus the "main memory controller" for the processor 22 and is accessible only by the processor 22 thus reserving the memory 24 for use of the processor 22. The second data processor 25 also has associated and connected thereto a memory controller 26 and a memory device 27. Similarly, the memory 27 is for the use of processor 25 and may not be accessed by any of the remaining subsystems of the configuration of FIG. 3.

Memory controller 30 is connected to both data processors 22 and 25; however, the memory controller includes provision therewith for selecting one of the data processors 22 is designated internally by the memory controller as the control processor and the controller will therefore look to that processor for certain types of command information. The memory controller 30 is connected to memory device 31 thus permitting both processors 22 and 25 to access the memory 31 through the memory controller 30. Similarly, memory controller 32 is connected to both data processor 22 and data processor 25; however, the memory controller 32 also includes means for designating a particular data processor as the control processor. Memory controller 32 will thus provide a means for selecting the data processor 25 as the control processor thereby recognizing certain commands and certain operations only by the processor 25 even though the memory controller 32 is connected to both processors 22 and 25. The memory controller 32 is connected to a memory device 34 thereby permitting both the data processor 22 and data processor 25 to gain access to the memory 34.

A plurailty of input/output controllers 35, 36 and 37 are provided and all are connected to both memory controllers 30 and 32. Each input/output controller may therefore access either memory device 31 or memory device 34 through the corresponding memory controller 30 or 32. An input/output controller may therefore also request access to memory and be awarded priority in accordance with a predetermined priority scheme in a particular memory controller while nevertheless being awarded a different priority in a different priority scheme in a second memory controller. Each input/output controller is connected to a plurality of input/output devices as described previously. The configuration shown in FIG. 3 may actually comprise overlapping but otherwise independent data processing systems. Accordingly, the processors and other subsystems have been designated by either the letter A or the letter B. Data processing system A would include the processor 22, memory controller 23, and memory 24. The processor would communicate with input/output controllers 35 and 36 through the memory controller 30 and would also share access to memory 31 through the memory controller 30. Data processing system B would include processor 25, memory controller 26, and memory device 27. The processor 25 would gain access to the memory 34 through the memory controller 32 and share the memory with input/output controller 37. The two data processors A and B may intercommunicate through the corresponding memory controllers 30 and 32 and may thus access each others memory to gain information and data to perform multiprocessing operations wherein each processor is executing an independent program which nevertheless may be interrelated in certain circumstances such as the execution of an executive program simultaneously with a slave program.

To facilitate the detailed description of the present invention, the data processing system has been divided into three major components each corresponding to a major subsystem of the data processing system. The data processor will first be described, the input/output controller will then be described, and finally, the memory controller together with a connected memory device will be described. To facilitate the detailed description of the subsystems, reference may first be had to FIG. 4–19 illustrating the logic symbology utilized in the various subsystems to be described. Referring to FIGS. 4, 5 and 6, typical symbols for AND-gates are shown each performing the logical conjunction of inputs A and B; however, FIG. 6 indicates a logical inversion of the input B prior to the conjunction in the AND-gate. FIG. 7 shows a logic symbol for a NAND-gate while FIGS. 8 and 9 show logic symbology for NOR-gates. The difference between FIGS. 8 and 9 merely represents a different physical electronic connection of the element of the gate and the figures are otherwise identical. FIGS. 10 and 11 each show logical OR-gates for performing the disjunctive combination of inputs A and B. In some instances, the utilization of OR-gate requires the logical implementation of an exclusive OR. Thus, FIG. 12 indicates the logic symbol for an exclusive OR-gate. FIGS. 13 and 14 show the two symbols utilized for inverters. An inverter receives a logic level and provides at the output thereof a logic level indicating the inverse of the level received. FIG. 15 shows a logic symbol for a flip-flop; the inputs to the flip-flop correspond to the set and reset logic levels and the output thereof corresponds to the one and zero logic values. FIG. 16 indicates a gated flip-flop wherein the set input assumes a true logic level only upon the receipt of true logic levels A and B; similarly, the reset input to the flip-flop assumes a true state only when logic levels C and D are true. The flip-flop FIG. 16 will assume either the set or reset state, assuming an appropriate logic level is applied thereto, only after a pulse is received by the flip-flop. Thus, to set or reset a flip-flop of FIG. 16, the appropriate logic levels must be received by the flip-flop and must be present at the set or reset input thereof when the triggering pulse is received thereby.

FIGS. 17, 18 and 19 each indicate amplifiers for receiving and amplifying pulse signals throughout the system. FIG. 17 indicates a simple amplifier receiving a positive-going pulse and providing a similar positive-going pulse. FIG. 18 indicates a pulse inversion together with the amplification. FIG. 19 indicates that the amplifier requires a certain predetermined polarity input to provide an output therefrom.

The various subsystems of the data processing system to be described may, in some instances, utilize signal designations that are not necessarily consistent with designations in other subsystems; accordingly, to facilitate signal tracing the following System Interface Listing is provided. This listing will enable one to determine the signal designation at the input and output of the memory controller and the corresponding signal designation at the connection between the processor and memory controller or the input/output controller and memory controller.

SYSTEM INTERFACE LISTING

| Processor | Memory Controller | Input/output Controller |
|---|---|---|
| $DI_0$ | $D_0$ (Input) | RΔ00 |
| $DI_1$ | $D_1$ | RΔ01 |
| $DI_2$ | $D_2$ | RΔ02 |
| . | . | . |
| . | . | . |
| . | . | . |
| $DI_{35}$ | $D_{35}$ | RΔ35 |
| $DO_0$ | $D_0$ (Output) | JΔ00 |
| $DO_1$ | $D_1$ | JΔ01 |
| . | . | . |
| . | . | . |
| . | . | . |
| $DO_{35}$ | $D_{35}$ | JΔ35 |
| $A_0$ | $A_0$ | RΔLA |
| $A_1$ | $A_1$ | RΔLB |
| $A_2$ | $A_2$ | RΔLC |
| . | . | . |
| . | . | . |
| . | . | . |
| $A_{17}$ | $A_{17}$ | RΔLT |
| IA-A | IA-A | JΔAA |
| IA-B | IA-B | JΔAB |
| IA-C | IA-C | JΔAC |
| CMDA | CMD A | RΔCA |
| CMDB | CMD B | RΔCB |
| CMDC | CMD C | RΔCC |
| CMDD | CMD D | RΔCD |
| $IA | $IA | JΔAS |
| PRO | Protect or M or S | RΔPR |
| $PIN | $PIN | |
| $DA | $DA | JΔDS |
| Z0 | Z0 | RΔL1 |
| Z1U | Z1U | RΔL4 |
| Z1L | Z1L | RΔZ0 |
| Z2 | Z2 | RΔZ1 |
| Z3 | Z3 | RΔZ2 |
| Z4U | Z4U | RΔZ3 |
| Z4L | Z4L | RΔZ4 |
| Z5 | Z5 | RΔZ5 |
| $INT | $INT | RΔL9 |
| XIP | XIP | |
| $DP | $DP | |
| $CON | $CON | JΔCS |

What is claimed is:

1. In a data processing system including a data processing unit which sequentially performs a series of prescribed operations defined as a program, the improvement thereto of means to effect a deviation from a first program to a second program comprising: first means for noting the existence of a condition necessitating a deviance from said first program and for providing an output in response thereto; second means responsive to said output of said first means for developing an instruction word, said instruction word including an address portion specifying a memory address location in said second program and a command portion specifying a memory accessing cycle, said address portion being dependent upon the condition necessitating said deviance; and means responsive to said instruction word for accessing the memory location specified by said address portion of said instruction word and for bringing the contents of said memory location to said data processing unit.

2. In a data processing system of the type including a memory having a plurality of storage locations and a data processing unit which sequentially performs a series of prescribed operations defined as a program, the improvement thereto of means to effect a deviation from a first program to a subroutine comprising: a plurality of first means each noting the existence of a condition necessitating a deviance from said program and for providing an output in response thereto; second means responsive to the output of said first means for developing an instruction word including an address portion specifying a memory storage location of said subrotuine and a command portion specifying a memory accessing cycle, said address portion being dependent upon which of said plurality of first means notes the necessity of a deviance; and means responsive to said instruction word for accessing the memory storage location specified by said address portion of said intruction word and for bringing the contents of said memory storage location to said data processing unit.

3. In a data processing system the combination comprising: a data processing unit for sequentially performing a series of prescribed operations defined as a program; a memory unit capable of storing a plurality of information items within a plurality of selectively addressable storage locations; means interconnecting said data processing unit and said memory unit whereby selected information items may be transferred therebetween; a plurality of first means for respectively registering the existence of individual conditions necessitating a deviance from a first program to a second program and for providing an output indicative thereof; second means selectively responsive to the outputs of said plurality of first means for developing an instruction word information item, said instruction word information item including an address portion specifying a particular memory storage location in said second program and a command portion specifying a memory accessing cycle, said address portion dependent upon the individual condition necessitating said deviance; and means responsive to said instruction word for accessing the memory unit storage location specified by the address portion of said instruction word and for bringing the information item stored in the memory location thus accessed over said interconnecting means to said data processing unit.

4. In a data processing system the combination comprising: a data processing unit for sequentially performing a series of prescribed operations defined as a program; a memory unit capable of storing a plurality of information items within a plurality of selectively addressable storage locations; means interconnecting said data processing unit and said memory unit whereby selected information items may be transferred therebetween; a plurality of first means, included within said data processing unit, each registering the existence of a condition necessitating a deviance from said program to a subroutine and for providing an output indicating thereof, second means within said data processing unit responsive to said output of said first means for developing an instruction word information item, said instruction word including an address portion specifying a memory address location of said subroutine in accordance with the particular output of said first means and a command portion specifying a memory accessing cycle; and means responsive to said instruction word for accessing the memory unit storage location specified by the address portion of said instruction word and for bringing the contents of said memory location thus accesssed over said interconnecting means to said data processing unit.

5. In a data processing system of the type comprising a memory unit capable of storing a plurality of information items within a plurality of selectively addressable storage locations, a data processing unit for sequentially performing a series of prescribed operations defined as a program, and means interconnecting said memory unit and data processing unit whereby selected information items may be transferred therebetween, the improvement comprising: a plurality of first means within said data processing unit each capable of registering the existence of a prescribed condition necessitating the deviance from a first program to a second program and for respectively providing an output indicative thereof; second means within said data processing unit responsive to the outputs of said plurality of first means, said second means responsive to only one of said outputs at any one time, said second means operable to develop an instruction word including a specified address portion in accordance with the output to which said second means is then responsive, said specified address portion defining a location in said memory unit associated with said second program, said instruction word also including a command portion specifying a memory accessing cycle; and means responsive to said instruction word for accessing the memory location specified by said address portion of said instruction word and for transferring through said interconnecting means from said memory unit to said data processing unit the contents of said memory location.

6. In a data processing system of the type comprising a memory unit capable of storing a plurality of information items within a plurality of selectively addressable storage locations, a data processing unit for sequentially performing a series of prescribed operations defined as a program, and means interconnecting said memory unit and said data processing unit whereby selected information items may be transferred therebetween, the improvement comprising: a plurality of first means each capable of registering the existence of a prescribed condition necessitating the deviance from a first program to a subroutine and for respectively providing an output indicative thereof; second means within said data processing unit responsive to the outputs of said plurality of first means, said second means responsive to only one of said outputs at any one time, said second means operable to develop an instruction word including a specified address portion in accordance with the output to which said second means is then responsive, said specified address portion defining an addressable storage location associated with a subroutine, said instruction word also including a command portion specifying a memory accessing cycle; priority means for determining the order of response of said second means to the output of said plurality of first means; and means responsive to said instruction word thus developed for accessing the memory location specified by said address portion of said instruction word and for transferring through said interconnectng means from said memory unit to said data processing unit the contents of said memory location.

7. In a data processng system of the type including a data processing unit which sequentially performs a series of prescribed operations defined as a program, the improvement thereto of means for effecting a deviation from a first program to a second program comprising: a plurality of bistable elements each capable of providing an output designating the existence of a condition necessitating a deviance from said first program; means responsive to the output of each of said bistable devices for developing an instruction word including an address portion, dependent upon which of said bistables is being responded to, specifying a memory address location of said second program and a command portion specifying a memory accessing cycle; and means responsive to said instruction word for accessing the memory location specified by said address portion and for bringing to said data processing unit the contents of said memory location.

8. In a data processing system of the type including a data processing unit which sequentially performs a series of prescribed operations defined as a program, the improvement thereto of means for effecting a deviation from a program to a subroutine comprising: a plurality of bistable devices each capable of providing an output designating the existence of a condition necessitating a deviance from the program; means including encoding means responsive to the individual outputs of said bistable devices for developing an instruction word including a specific address portion in accordance with the individual output being recognized specifying a memory address location in said subroutine and a command portion specifying a memory accessing cycle; and means responsive to said instruction word for accessing the memory location specified by said address portion and for bringing to a data processing unit the contents of said memory location.

9. In a data processing system of the type including a data processing unit which sequentially performs a series of prescribed operations defined as a program, the improvement thereto of means for effecting a deviation from a program to a subroutine comprising: a plurality of bistable devices each capable of providing an output designating the existence of a condition necessitating a deviance from said program; means including an encoding means responsive to the output of said bistable devices for developing an instruction word, said instruction including an address portion developed, in part, by said encoding means in accordance with that bistable device being recognized and specifying a memory address location associated with said subroutine, said instruction word further including a command portion specifying a memory accessing cycle; and means responsive to said instruction word for accessing the memory location specified by said address portion and for bringing to a data processing unit the contents of said memory location.

10. In a data processing system including a data processing unit which sequentially performs a series of prescribed operations defined as a program, the improvement thereto of means for effecting a deviation from a first program then being executed to a second program comprising: a plurality of bistable devices each providing an output in response to the existence of a condition necessitating a deviance from said first program; first means responsive to individual outputs of said bistable devices for developing an instruction word including an address portion, in accordance with that individual output being recognized, specifying a memory address location identified with said second program and a command portion specifying a memory accessing cycle, said first means including an encoding means and a plurality of switch means each providing outputs collectively constituting said address portion of said instruction word; and means responsive to said instruction word for accessing the memory location specified by said address portion and for bringing to a data processing unit the contents of said memory location.

11. In a data processing system of the type which sequentially performs a series of prescribed operations defined as a program, the improvement thereto of means to effect a deviation from a first program to a subroutine comprising: a plurality of bistable devices having an input and an output, said input of said bistable devices being selectively connected to means designating the necessity of a deviance from said first program, said output of said bistable devices designating the need for said deviance; means responsive to said output of said bistable devices for developing an instruction word including an address portion specifying a memory address location of said subroutine, said address portion being dependent upon the output of said bistable devices, and a command portion specifying a memory accessing cycle; and means responsive to said instruction word for accessing the memory location specified by said address portion of said instruction word and for bringing to a data processing unit the contents of said memory location.

12. In a data processing system of the type which sequentially performs a series of prescribed operations defined as a program, the improvement thereto of means to effect a deviation from a first program to a second program comprising: a plurality of bistable devices having an input and an output, said input of said bistable devices being selectively connected to means designating the necessity of a deviance from said first program, said output of said bistable devices designating the need for said deviance; means including encoding means responsive to said output of said bistable devices for developing an instruction word including an address portion in accordance with said output specifying a memory address location of said second program and a command portion specifying a memory accessing cycle; and means responsive to said instruction word for accessing the memory location specified by said address portion of said instruction word and for bringing to a data processing unit the contents of said memory location.

13. In a data processing system of the type which sequentially performs a series of prescribed operations defined as a program, the improvement thereto of means to effect a deviation from a first program to a subroutine comprising: a plurality of bistable devices having an input and an output, said input of said bistable devices being selectively connected to means designating the necessity of a deviance from said program, said output of said bistable devices designating the need for said deviance; first means responsive to said output of said bistable devices for developing an instruction word including an address portion in accordance with said output specifying a memory address location associated with said subroutine and a command portion specifying a memory accessing cycle, said first means including an encoding means and a plurality of switch means each providing outputs collectively constituting said address portion of said instruction word; and means responsive to said instruction word for accessing the memory location specified by said address portion of said instruction word and for bringing to a data processing unit the contents of said memory location.

References Cited

UNITED STATES PATENTS

| | | | |
|---|---|---|---|
| 3,387,262 | 6/1968 | Ottaway et al. | 340—172.5 |
| 3,373,408 | 3/1968 | Ling | 340—172.5 |
| 3,371,319 | 2/1968 | Masure | 340—172.5 |
| 3,346,851 | 10/1967 | Thornton et al. | 340—172.5 |
| 3,345,618 | 10/1967 | Threadgold | 340—172.5 |
| 3,337,854 | 8/1967 | Cray et al. | 340—172.5 |
| 3,319,226 | 5/1967 | Mott et al. | 340—172.5 |
| 3,312,951 | 4/1967 | Hertz | 340—172.5 |
| 3,274,561 | 9/1966 | Hallman et al. | 340—172.5 |
| 3,263,219 | 7/1966 | Brun et al. | 340—172.5 |
| 3,200,380 | 8/1965 | MacDonald | 340—172.5 |
| 3,029,414 | 4/1962 | Schrimpf | 340—172.5 |
| 3,061,192 | 10/1962 | Terzian | 235—157 |
| 3,063,036 | 11/1962 | Reach | 340—172.5 |
| 3,260,998 | 7/1966 | Fluegel | 340—172.5 |

GARETH D. SHAW, Primary Examiner